May 21, 1929. W. E. BINKLEY 1,714,155
AUTO STEERING WHEEL
Filed March 12, 1928

Inventor
William E. Binkley

Patented May 21, 1929.

1,714,155

UNITED STATES PATENT OFFICE.

WILLIAM E. BINKLEY, OF NORWOOD, OHIO.

AUTO STEERING WHEEL.

Application filed March 12, 1928. Serial No. 260,901.

This invention relates to an automobile steering wheel in which an object has been to produce such a steering wheel as will enable a vehicle or automobile driver to manipulate the steering apparatus of his vehicle or machine with a greater degree of comfort, with less exertion or physical effort and more rapidly than can be accomplished with the usual steering wheel.

A still further object is in designing a steering wheel that will prevent obstruction of view of the driver as well as giving easy access in leaving or getting into the driver's seat.

These and other objects are attained in the steering wheel described in the following specification and illustrated in the accompanying drawing, in which.

This invention has been shown as embodying a frame 5 which in general shape resembles the frame of a pair of eye glasses. The lobes 6 and 7 of the frame retain the respective hand holds 8 and 9. These hand holds are mounted so as to be rotatable within their respective lobes and are provided with respective grips 10 and 11 by means of which the steering wheel is operated, in that these grips enable the operator to grasp the same to operate and steer to the best physical advantage and without strain to the operator.

Figure 1:
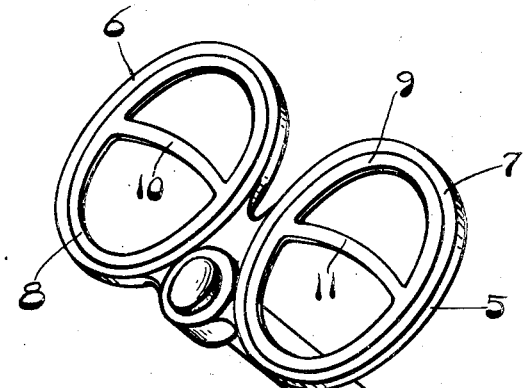
Fig. 1 is a perspective showing my improved steering wheel mounted on a steering post.
Figure 3:
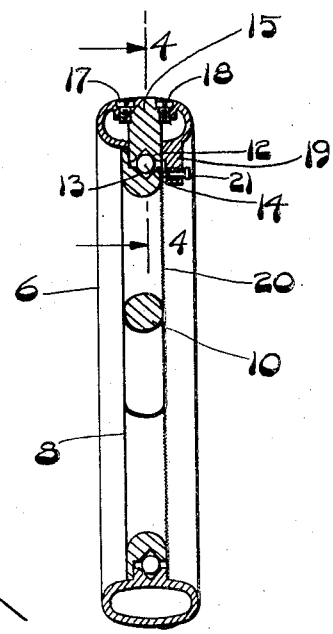
Fig. 3 is an enlarged sectional view through one element of the wheel and taken on the line 3—3 of Fig. 2.
Figure 4:
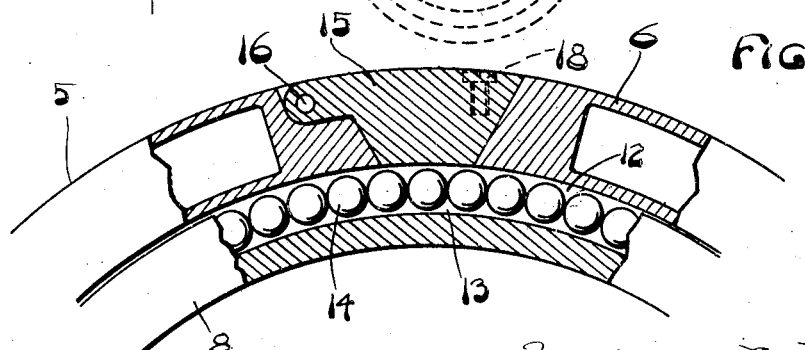
Fig. 4 is an enlarged fragmental sectional view taken on the line 4—4 of Fig. 3.

The manner of mounting the hand holds 8 and 9 rotatably consists in providing a centrally located V shaped ball race 12 in each of the lobes 6 and 7, see Fig. 3, with a cooperating centrally located V shaped ball race 13 in each of the hand holds 8 and 9, with balls 14 in the races so that the hand holds may be rotated freely. The manner in which the balls are placed in their mounting races consists in providing in the periphery of each lobe 6 and 7 a movable section or block 15, which, may be pivoted so as to swing into or out of position, as is shown at 16, in Fig. 4, the manner of fastening block 15 against displacement consisting of screws 17 and 18 which enter the lobes as well as the block, as shown in Fig. 3. By this means the balls may be placed in the races when the block is swung back, or removed therefrom in the same manner. Thus the hand holds may be locked against displacement or removed in the same manner. When the hand holds are locked against displacement they remain rotatable nevertheless.

Figure 2:
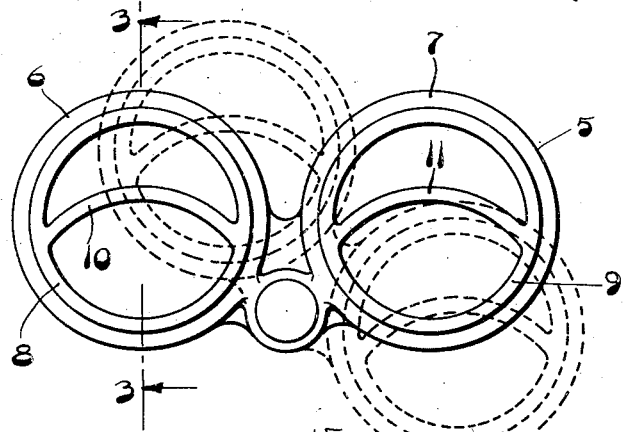
Fig. 2 is a plan view showing my improved steering wheel and the positions its parts occupy when the wheel has been moved to different positions as in steering.

In using my improved steering wheel it is but necessary to grasp the grips 10 and 11 with the hands in the most natural positions. Then by exerting a pull on one hand hold and a push on the opopsite hand hold the turning effort or torque which may be transmitted is materially increased over the usual type circular rim wheel where the hands have to be placed in such awkward and unnatural positions. In turning the steering wheel the rotary mounting of the hand holds permits them to remain in the most natural positions adaptable to the hands regardless of the positions to which the wheel may be moved as suggested in dotted lines in Fig. 2.

Aside from the advantages obtained by the natural positions afforded the hand during steering wheel movements may be mentioned the advantage obtained in increased seating room back of the steering wheel. In the usual steering wheel the portion next to the driver is frequently a source of obstruction to the occupant of the driver's seat, especially if the driver is somewhat stout or if the seat is set close in. Such obstruction is objectionable and is also a source of annoyance to any driver in seating himself back of the steering wheel or in leaving the seat. My improved steering wheel can not obstruct the driver's seat in this manner because the lower portion of the usual steering wheel has been entirely eliminated. So in the same manner the upper central portion of the steering wheel is eliminated so that sight obstruction in driving is impossible.

As an added feature which will be found to be of convenience in preventing the hand holds from displacement from the position in which they have been left by the driver for any reason whatever, I have provided a lug 19 on each of the lobes 6 and 7. A serrated back edge 20 on each hand hold 8 and 9 cooperates with a spring pressed ratchet or pawl 21 in each lug 19 in holding the hand holds as they are left by the driver so that their position is maintained and assured for instant use of the driver.

Having thus described my invention what I claim is:—

1. A steering wheel comprising a frame adapted for attachment to a steering column, consisting of two lobes placed on opposite sides of the steering column, a hand hold located within each lobe rotatably, each hand hold having a grip thereon for the hand.

2. A steering wheel comprising a frame adapted for attachment to a steering column, consisting of a frame of two lobes disposed on opposite sides of the steering column, a hand hold for each lobe, said lobes and hand holds having cooperative ball races and balls therein mounting the hand holds rotatively in their respective lobes, said balls in occupying the races serving as a means to lock the hand holds against displacement, and means in the lobes for placement and removal of the balls.

3. A steering wheel comprising a frame adapted for attachment to a steering column, consisting of two lobes placed on opposite sides of the steering column, a hand hold located within each lobe rotatably, each hand hold having a grip therein for the hand, and a ratchet device on each cooperating hand hold and lobe adapted to retain the hand holds in any position in which they have been left.

In witness whereof, I affix my signature.

WILLIAM E. BINKLEY.